UNITED STATES PATENT OFFICE.

MORITZ ULRICH AND KARL HEIDENREICH, OF ELBERFELD, GERMANY, ASSIGNORS TO FARBENFABRIKEN OF ELBERFELD CO., OF NEW YORK, N. Y., A CORPORATION OF NEW YORK.

DISAZO DYE AND PROCESS OF MAKING SAME.

SPECIFICATION forming part of Letters Patent No. 687,171, dated November 19, 1901.

Application filed July 19, 1901. Serial No. 68,931. (No specimens.)

*To all whom it may concern:*

Be it known that we, MORITZ ULRICH and KARL HEIDENREICH, doctors of philosophy, chemists, (assignors to the FARBENFABRIKEN OF ELBERFELD CO., of New York,) residing at Elberfeld, Germany, have invented a new and useful Improvement in new Disazo Dye and Process of Making Same; and we hereby declare the following to be a clear and exact description of our invention.

Our invention relates to the production of new disazo dyestuffs by first tetrazotizing the disulfonic acid of para-paradiamidodiphenyl-urea having the formula

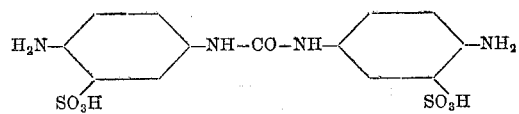

and then combining the resulting tetrazo derivative with two molecules of $beta_1$-$alpha_4$-amidonaphthol, the sulfonic acids thereof, or the alkylized derivatives of these bodies, such as $beta_1$-$alpha_4$-amidonaphthol-$alpha_3$-sulfonic acid, $beta_1$-$alpha_4$-amidonaphthol-$beta_3$-sulfonic acid, $beta_1$-ethylamido-$alpha_4$-naphthol-$beta_3$-sulfonic acid, or the like.

For the preparation of the hitherto-unknown disulfonic acid of para-paradiamidodiphenyl-urea we may use the following methods: Phosgene ($COCl_2$) is allowed to act in the presence of condensing agents on para-nitro-amidobenzene-meta-sulfonic acid (see *Eger Ber. d. Deutschen Chem. Gesellschaft* Vol. 21, page 2579) having the formula

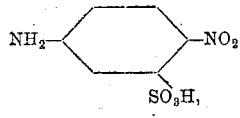

and the resulting disulfonic acid of dinitro-diphenylurea is then reduced, or phosgene ($COCl_2$) is caused to act on the monosulfonic acid of para-phenylenediamin. (See German Letters Patent No. 64,908.)

The new dyestuffs produced in the above-defined manner are alkaline salts of acids having the following general formula:

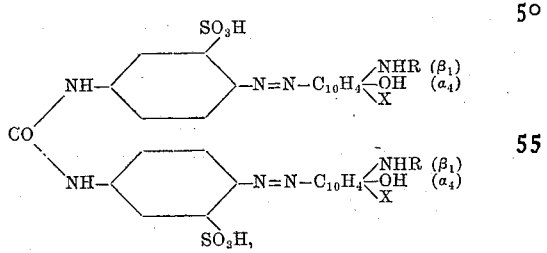

(X meaning in this formula a hydrogen atom which may be substituted by a sulfonic group, R meaning a hydrogen atom which may be substituted by an alkyl radical, such as methyl, ethyl, or the like) and are from red to brown powders, which dissolve in water with from a red to violet color. They dye unmordanted cotton from red to reddish-violet shades which are distinguished for a great fastness to light.

In order to produce the said disulfonic acid of para-paradiamidodiphenylurea having the above-given formula, we can proceed as follows, the parts being by weight: Twenty-four parts of the sodium salt of paranitroamido-benzene-meta-sulfonic acid having the above-given formula and 5.5 parts of calcined sodium carbonate are dissolved in water. Into the solution thus obtained while being continuously stirred a current of gaseous phosgene ($COCl_2$) is slowly introduced. The reaction is finished when a test portion acidulated with hydrochloric acid is not changed by the addition of a small quantity of sodium nitrite. During the reaction care must be taken that sodium carbonate be always in excess, and the temperature must be regulated in such a manner that crystals are not precipitated in the liquid. Subsequently the reaction mass is slightly acidulated by means of a mineral acid, and the resulting paste is added to a mixture of seventy-five parts of iron-filings with boiling water while being continuously stirred. After a short while the reduction is finished. The liquid is then filtered, and the residue remaining on the filter is extracted with a boiling solution of sodium carbonate. The new product thus produced is precipitated from the filtered liquid by the addition of an excess of hydrochloric acid. The resulting diphenylurea derivative represents colorless needles soluble with difficulty in water.

In carrying out the process for the production of the above-mentioned new dyestuffs we can proceed as follows, the parts being by weight: Forty-five parts of the sodium salt of the disulfonic acid of para-paradiamidodiphenylurea are diazotized in the usual manner with the aid of forty-two parts of a 36.5-percent. hydrochloric acid and fourteen parts of sodium nitrite. The resulting tetrazo compound is filtered off and stirred into a solution of fifty-seven parts of the neutral sodium salt of $beta_1$-amido-$alpha_4$-naphthol-$beta_3$-sulfonic acid. After having stirred for about twelve hours hot water is added to the reaction mass in order to dissolve the precipitate in the mixture, and the new dyestuff is isolated from the resulting solution by the addition of common salt, filtered off, dried, and pulverized. It is the sodium salt of an acid having the formula

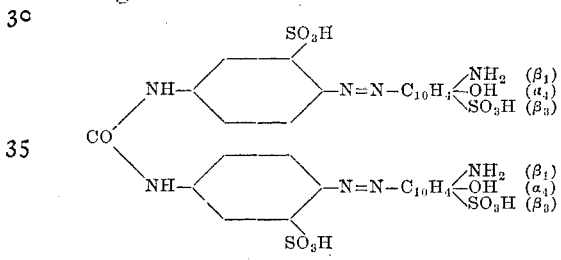

and is a reddish-brown powder, being readily soluble in water and in ammonia with a bluish-red color and insoluble in alcohol. By concentrated sulfuric acid (of 66° Baumé) it is dissolved with a bluish-black color, which is changed into violet on the addition of a small quantity of ice, while on the addition of a larger quantity of ice a violet precipitate is separated.

The new coloring-matter dyes unmordanted cotton bright-red shades fast to light.

The process proceeds in an analogous manner if other sulfonic acids of $beta_1$-$alpha_4$-amidonaphthol, such as $beta_1$-$alpha_4$-amidonaphthol-$alpha_3$-sulfonic acid or the alkylized derivatives of $beta_1$-$alpha_4$-amidonaphthol or its sulfonic acids, are employed.

Having now described our invention and in what manner the same is to be performed, what we claim as new, and desire to secure by Letters Patent, is—

1. The process for producing new disazo dyestuffs, which process consists in first tetrazotizing the disulfonic acid of para-paradiamidodiphenylurea having the following formula:

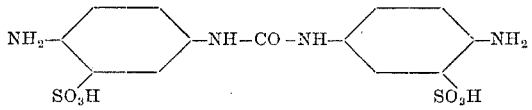

and then combining the resulting tetrazo compound with two molecules of naphthalene derivatives having the following general formula:

R meaning in this formula a hydrogen atom which can be substituted by an alkyl radical, X meaning a hydrogen atom which can be substituted by a sulfonic group, substantially as hereinbefore described.

2. The process for producing a new disazo dyestuff which process consists in first tetrazotizing the disulfonic acid of para-paradiamidodiphenylurea having the formula:

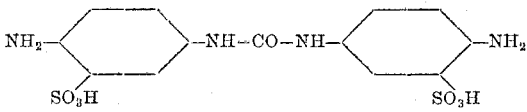

and then combining the resulting tetrazo compound with two molecules of $beta_1$-amido-$alpha_4$-naphthol-$beta_3$-sulfonic acid, substantially as hereinbefore described.

3. The herein-described new disazo dyestuffs which are alkaline salts of acids hereinbefore defined having the general formula:

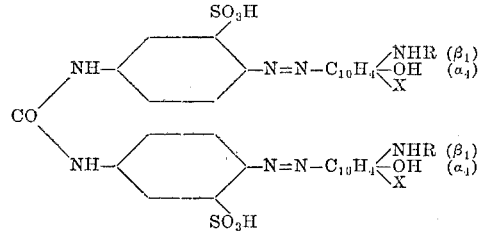

and which are from red to brown powders soluble in water with from a red to violet color, dyeing unmordanted cotton from red to reddish-violet shades which are distinguished for a great fastness to light, substantially as hereinbefore described.

4. The herein-described new disazo dyestuff being an alkaline salt of an acid having the following formula:

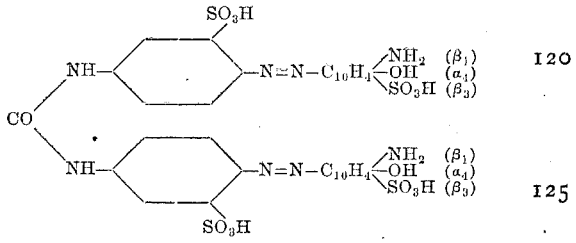

which in the form of the sodium salt is a reddish-brown powder, readily soluble in water and in ammonia with a bluish-red color and insoluble in alcohol, being dissolved by concentrated sulfuric acid of 66° Baumé with a bluish-black color which is changed into violet on the addition of a small quantity of ice, while on adding a larger quantity of ice a violet precipitate is separated; dyeing unmordanted cotton bright-red shades fast to light, substantially as hereinbefore described.

In testimony whereof we have signed our names in the presence of two subscribing witnesses.

MORITZ ULRICH.
KARL HEIDENREICH.

Witnesses:
J. A. RITTERSHAUS,
J. M. SCHADDESSI.